INVENTORS
DAVID E. THIELEN,
ALAN H. THIELEN and
ERNEST C. DROEGE

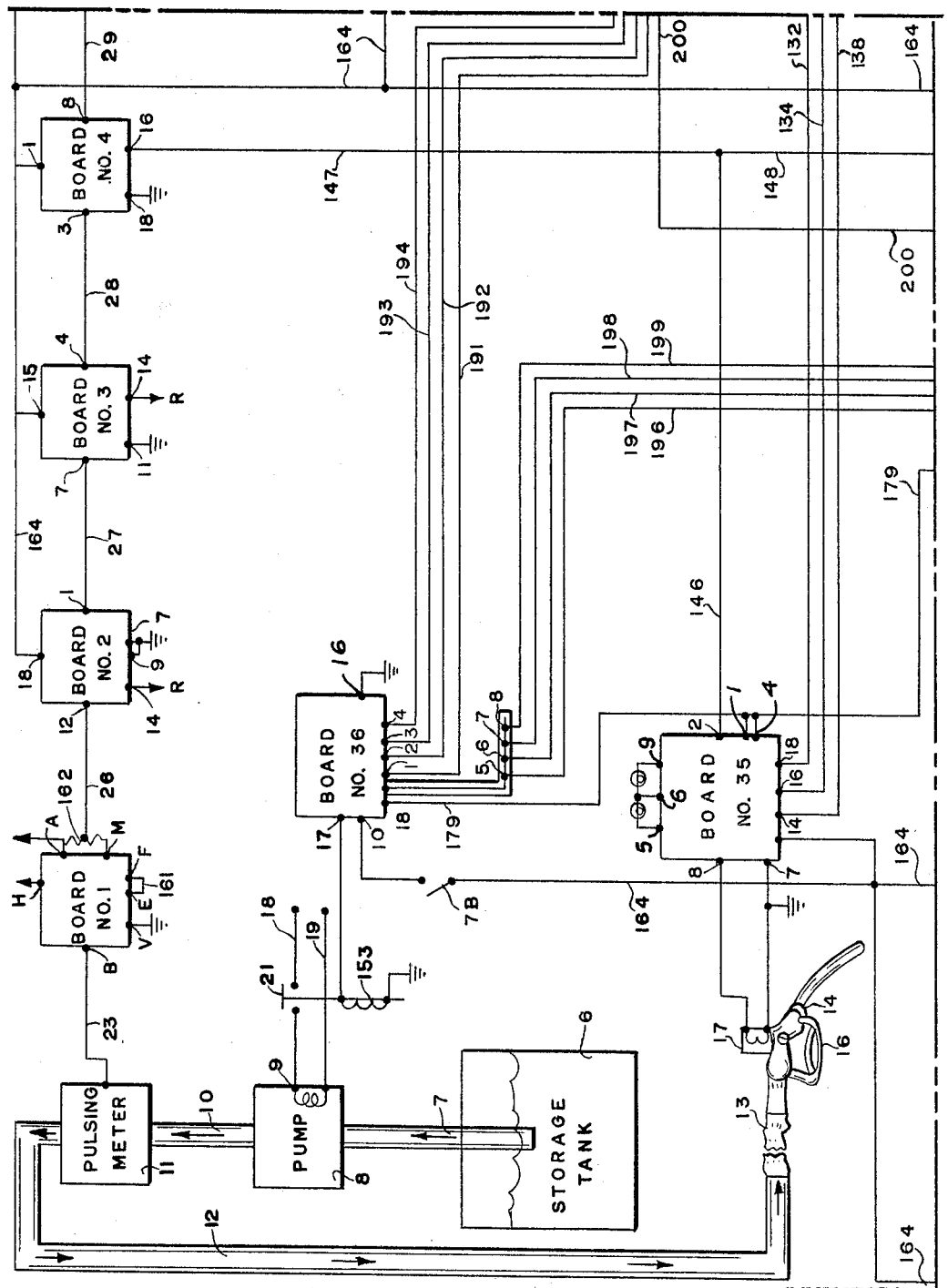

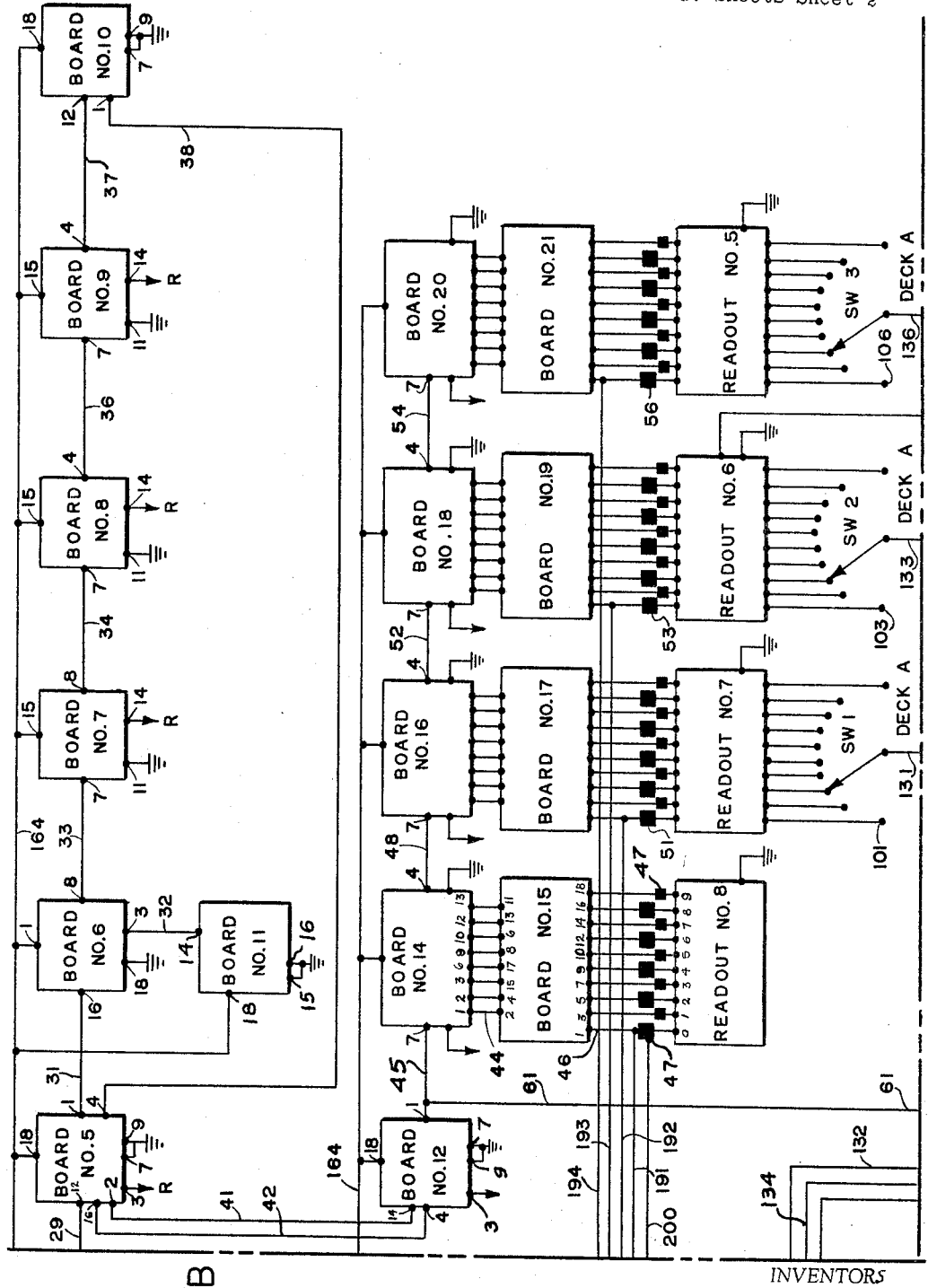

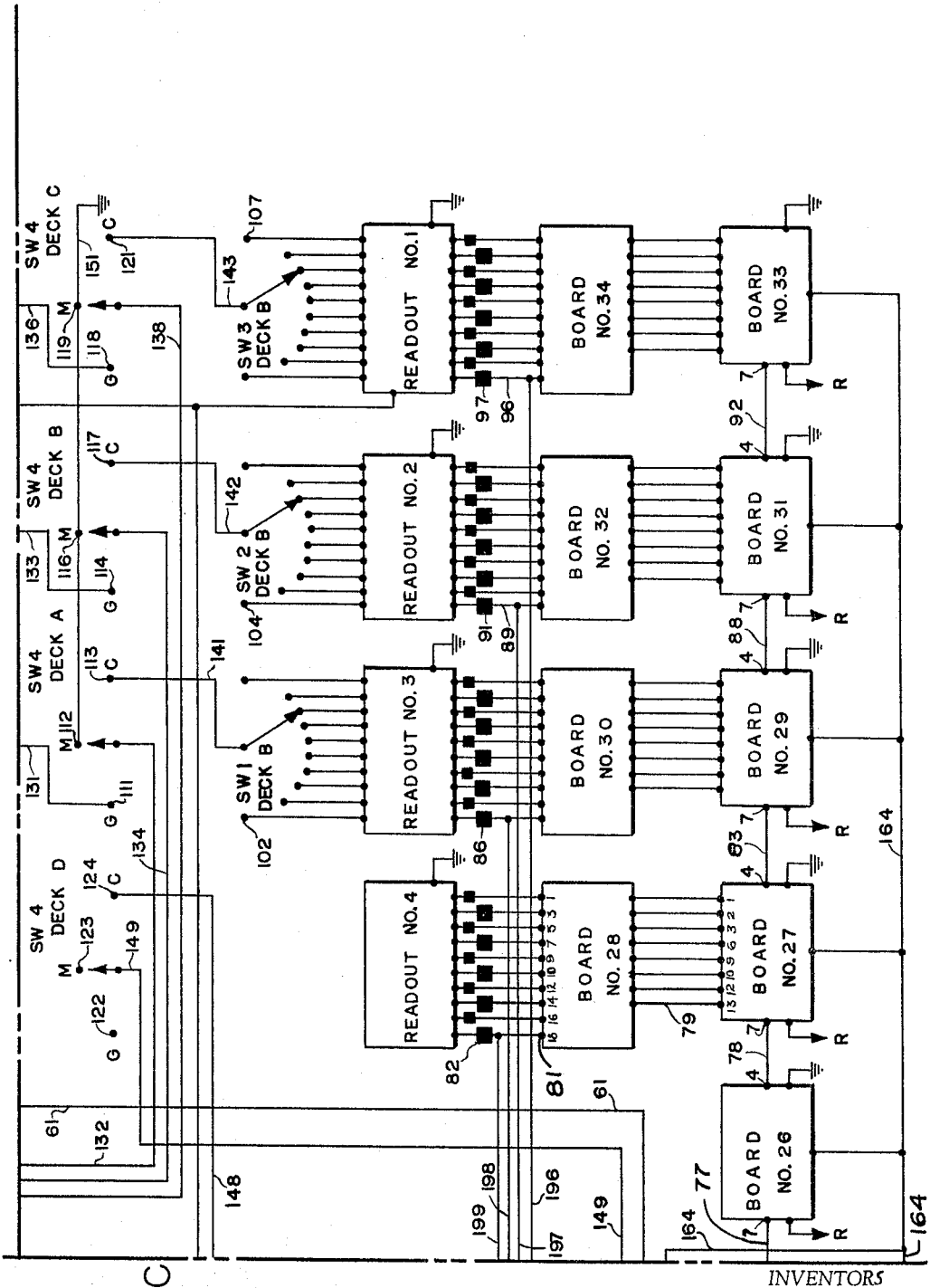

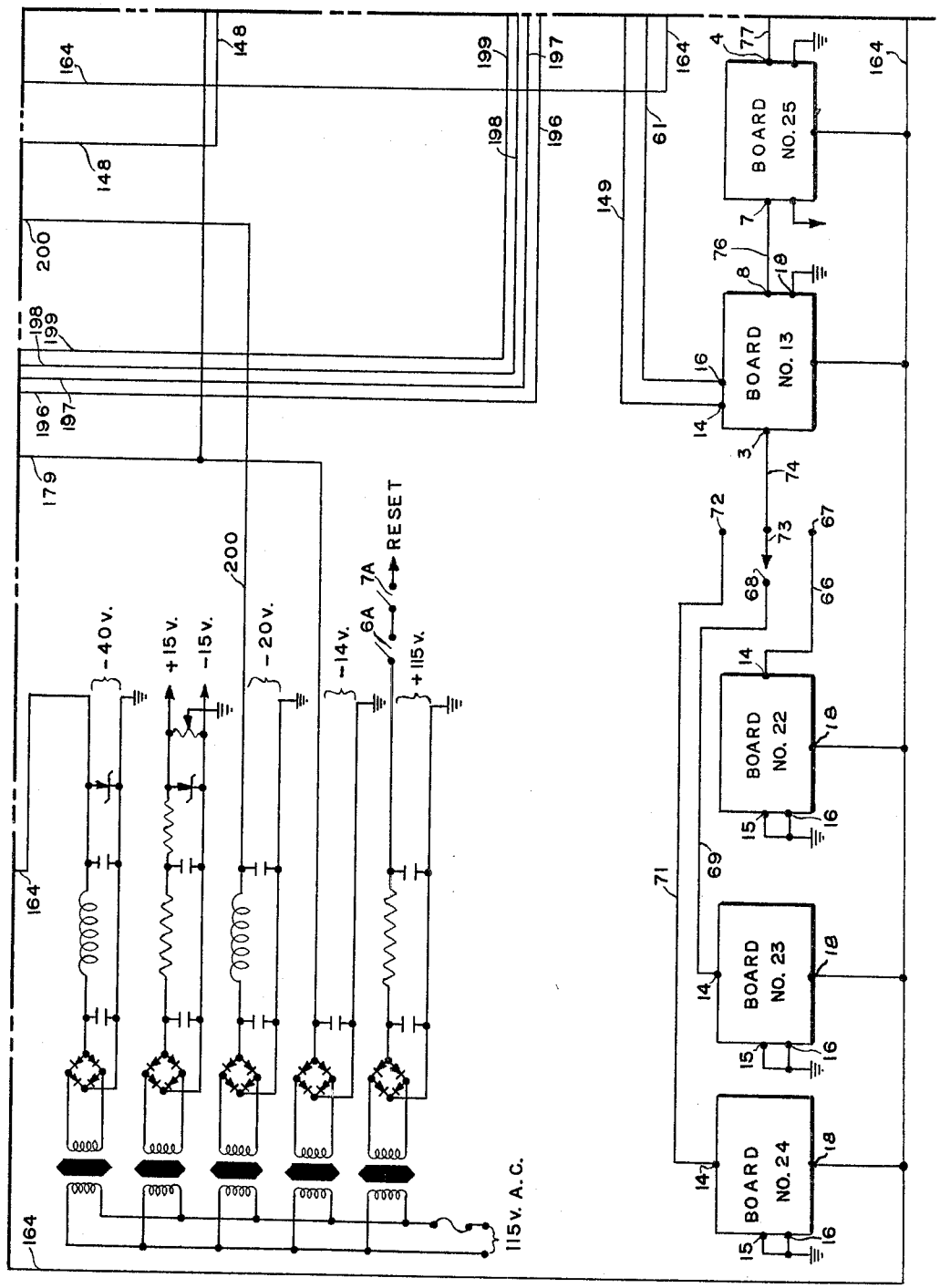

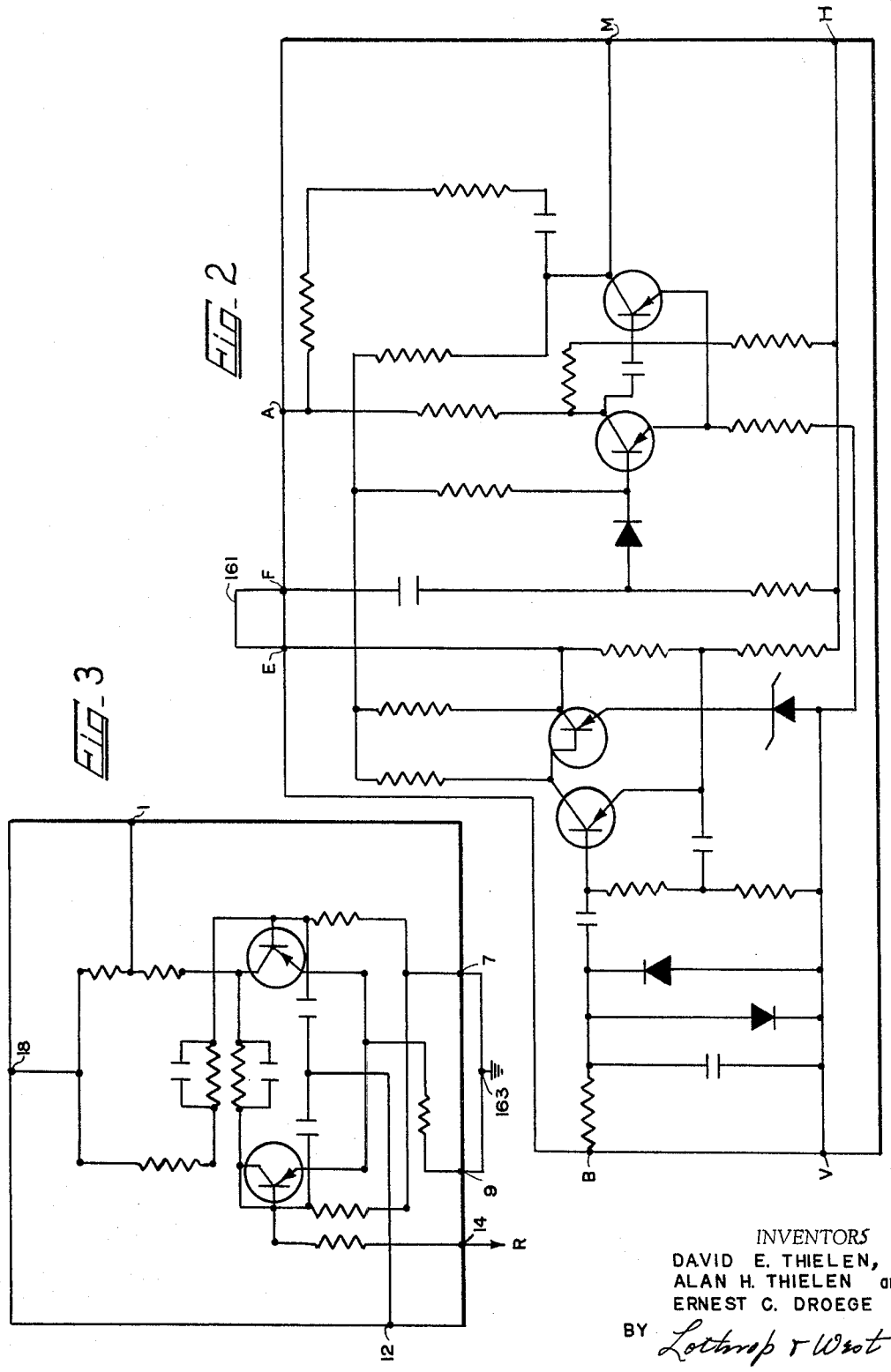

BY *Lothrop r West*

ATTORNEYS

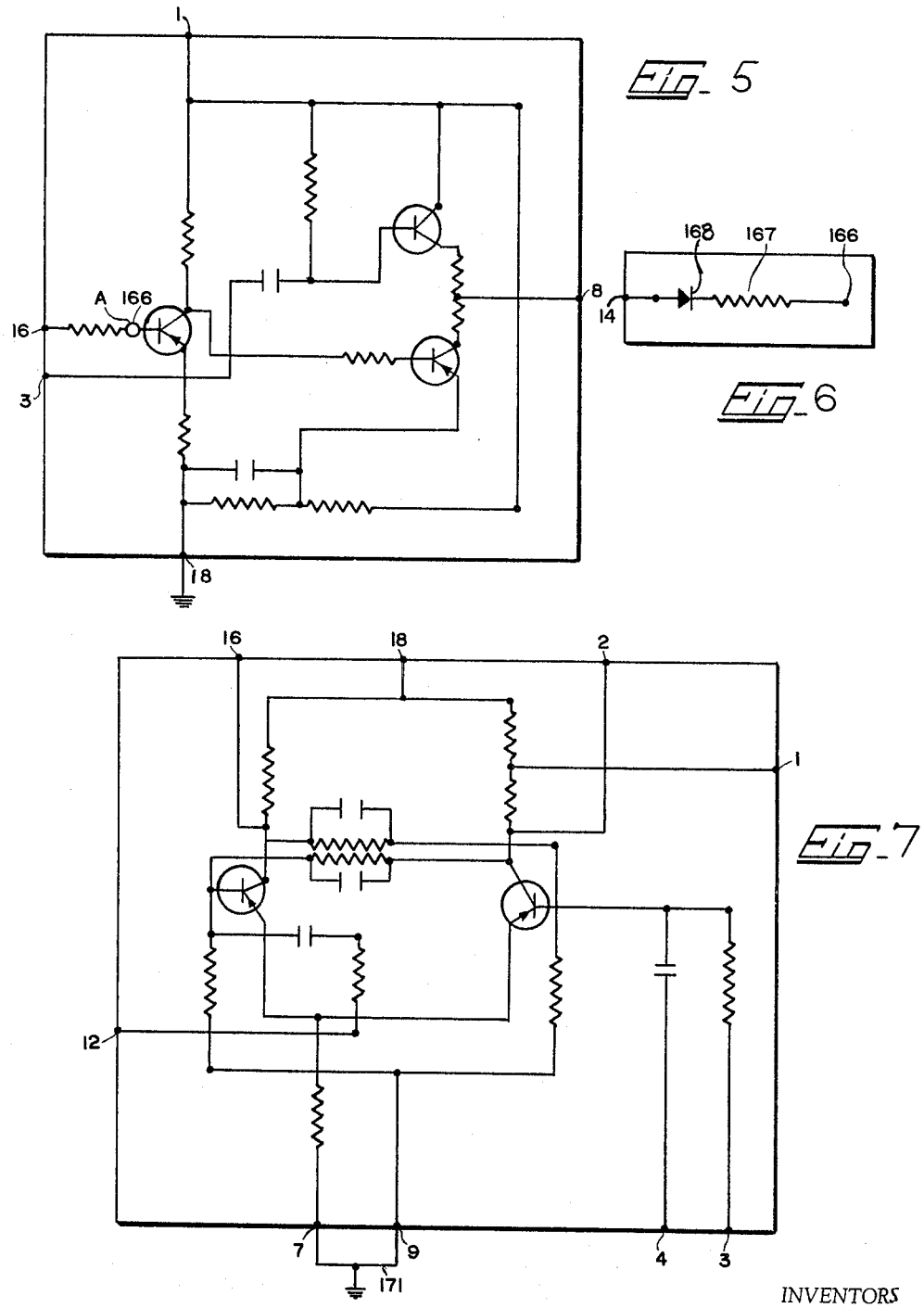

Oct. 11, 1966  D. E. THIELEN ETAL  3,278,082
LIQUID DISPENSING MECHANISM

Filed March 17, 1965  10 Sheets-Sheet 8

INVENTORS
DAVID E. THIELEN,
ALAN H. THIELEN and
ERNEST C. DROEGE

BY  *Lothrop & West*
ATTORNEYS

Oct. 11, 1966 D. E. THIELEN ETAL 3,278,082
LIQUID DISPENSING MECHANISM
Filed March 17, 1965 10 Sheets-Sheet 10
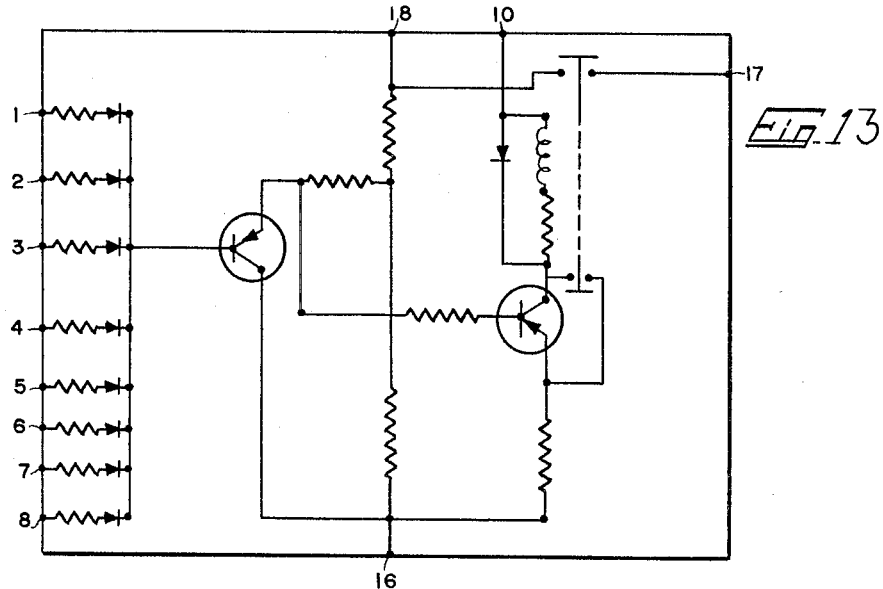
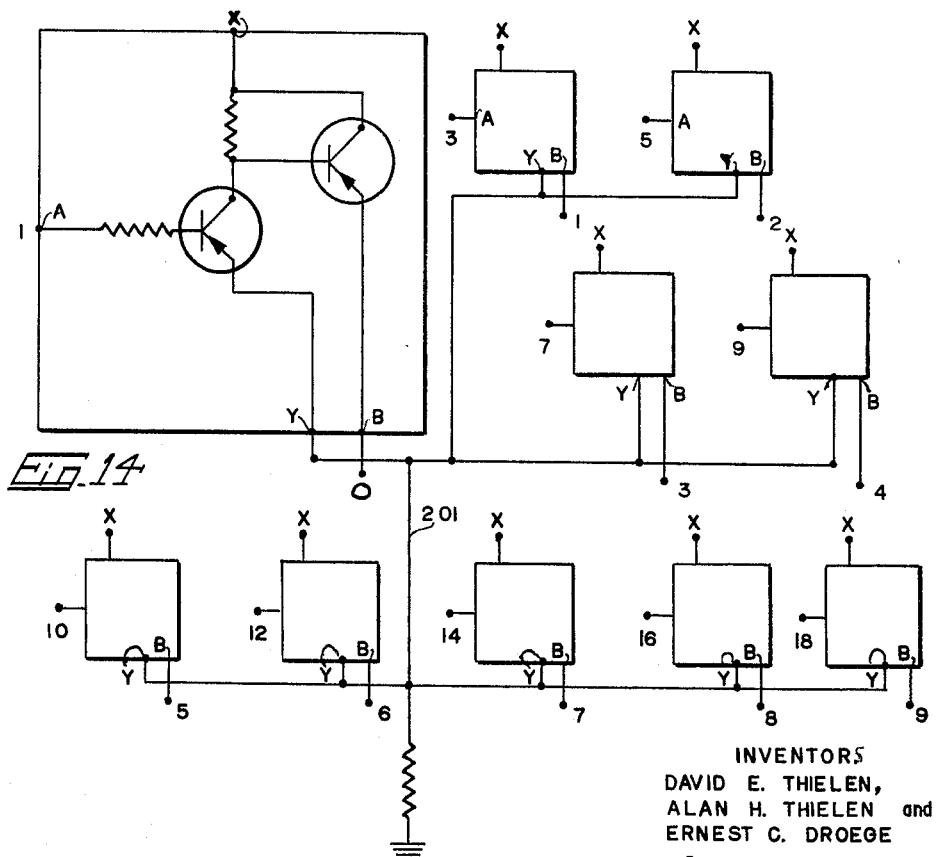
INVENTORS
DAVID E. THIELEN,
ALAN H. THIELEN and
ERNEST C. DROEGE
BY *Lothrop & West*
ATTORNEYS United States Patent Office 3,278,082
Patented Oct. 11, 1966

3,278,082
LIQUID DISPENSING MECHANISM
David E. Thielen and Alan H. Thielen, Sacramento, and Ernest C. Droege, Fair Oaks, Calif., assignors to Electro Pump, a corporation of California
Filed Mar. 17, 1965, Ser. No. 440,402
6 Claims. (Cl. 222—20)

Our invention relates to dispensing devices of the sort shown in the copending application of Alan H. Thielen, one of the applicants herein, entitled "Recorder, Electronic Computer and Preselector Mechanism for Liquid Dispensing Apparatus," filed November 19, 1963 with Serial No. 324,693, now Patent No. 3,211,332.

Under many circumstances there is a need for the measured dispensation of liquids, and this is particularly exemplified by the dispensation of gasoline in amounts which are customarily measured in gallons or fractions of gallons but may also be measured in moneysworth or dollar value. Sometimes the liquid is also dispensed on a completely manual basis in arbitrary amounts or values.

It is an object of the invenion to provide a liquid dispensing mechanism subject to manual supervision and control for dispensing of liquid such as gasoline without any automatic control.

It is also an object of the invention to provide a liquid dispensing mechanism in which the amount of liquid such as gasoline dispensed is indicated in either or both of two measures; that is, in volume units such as gallons and fractions thereof or in value units such as dollars and fractions thereof.

A still further object of the invention is to provide a liquid dispensing mechanism capable of being preset either in terms of gallons or in terms of dollars so as automatically to shut off when the preset quantity of liquid has been dispensed.

A still further object of the invention is to provide a liquid dispensing mechanism having the foregoing attributes but depending almost entirely on electronic mechanisms and depending but little on mechanical devices.

An additional object of the invention is to provide a liquid dispensing mechanism which will attain the foregoing objects yet will embody a number of commercially available components in its structure.

A still further object of the invention is to provide a number of controls or interlocks so that unwarranted or unauthorized operation of the structure cannot occur.

A still further object of the invention is in general to improve liquid dispensing mechanisms.

Other objects together with the foregoing are attained in the embodiment of the invention which is described in the accompanying description and which is illustrated in the accompanying drawings, in which:

FIGURE 1A is a schematic diagram of one portion of the elements and circuitry utilized in the liquid dispensing mechanism, certain parts of the disclosure being in block diagrammatic form;

FIGURE 1B is a view similar to FIGURE 1A and continues FIGURE 1A when placed alongside thereof on the right-hand side;

FIGURE 1C is a view similar to FIGURE 1A and continues the showing of FIGURE 1B when placed immediately below FIGURE 1B;

FIGURE 1D is a view similar to FIGURE 1A and continues FIGURE 1A when placed immediately therebelow and continues FIGURE 1C when placed to the left of FIGURE 1C;

Figure 4:
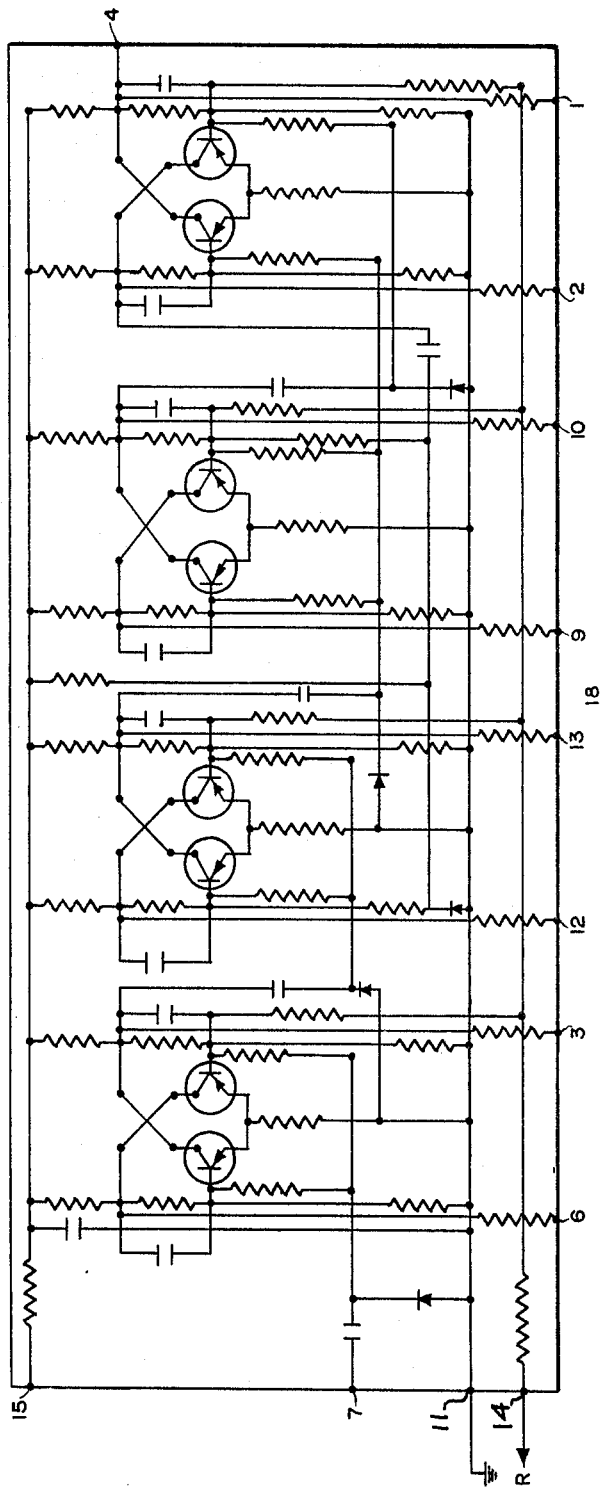
Figure 8:
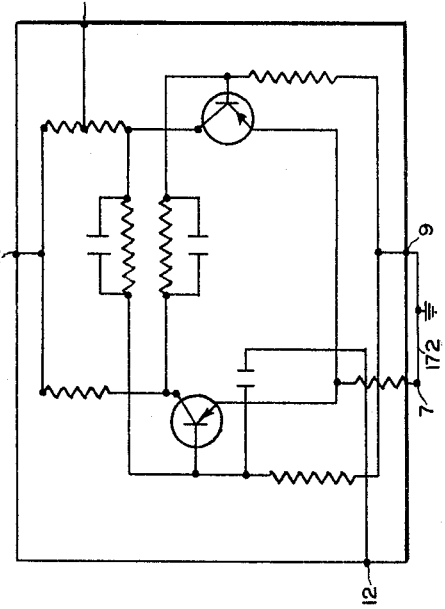
Figure 9:
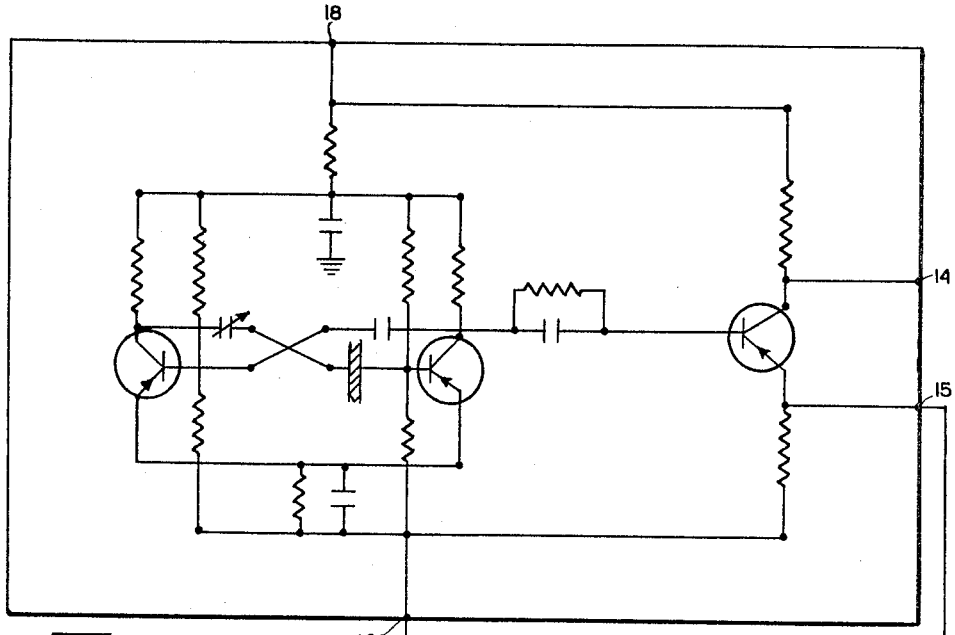
Figure 10:
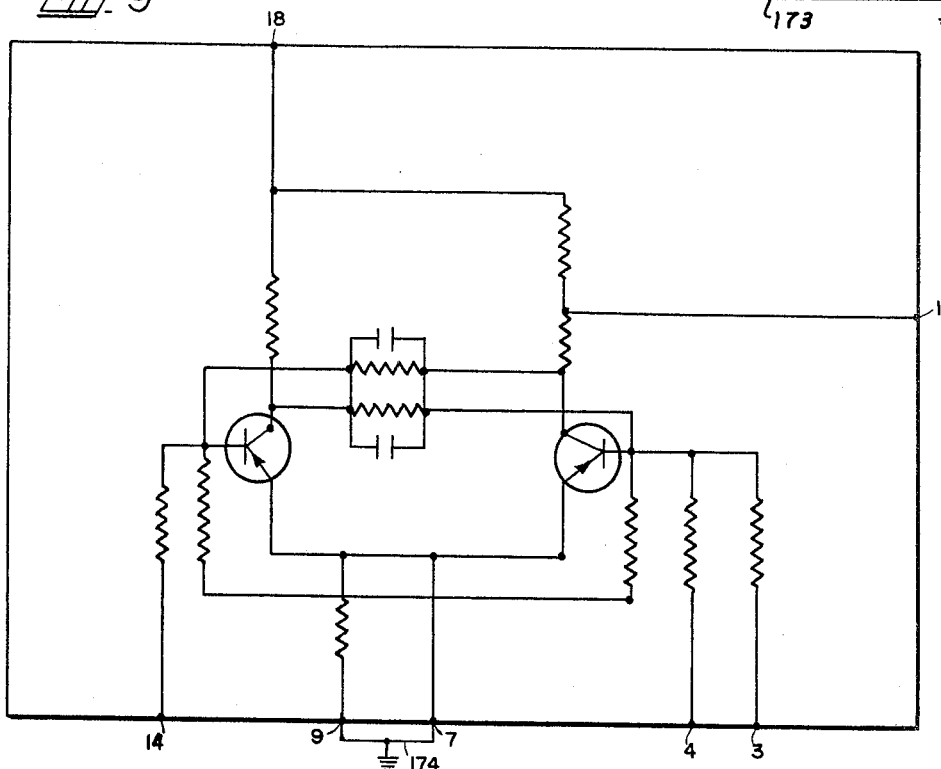
Figure 11:
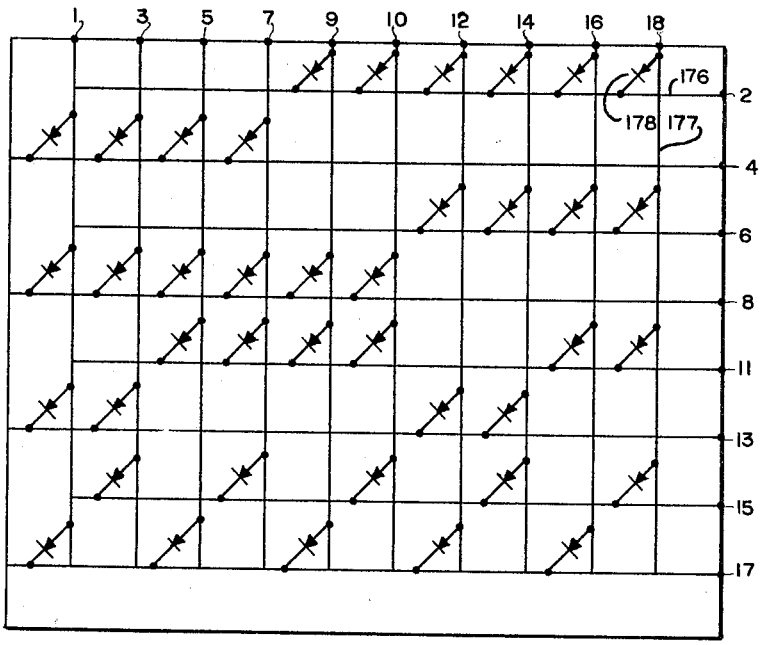
Figure 12:
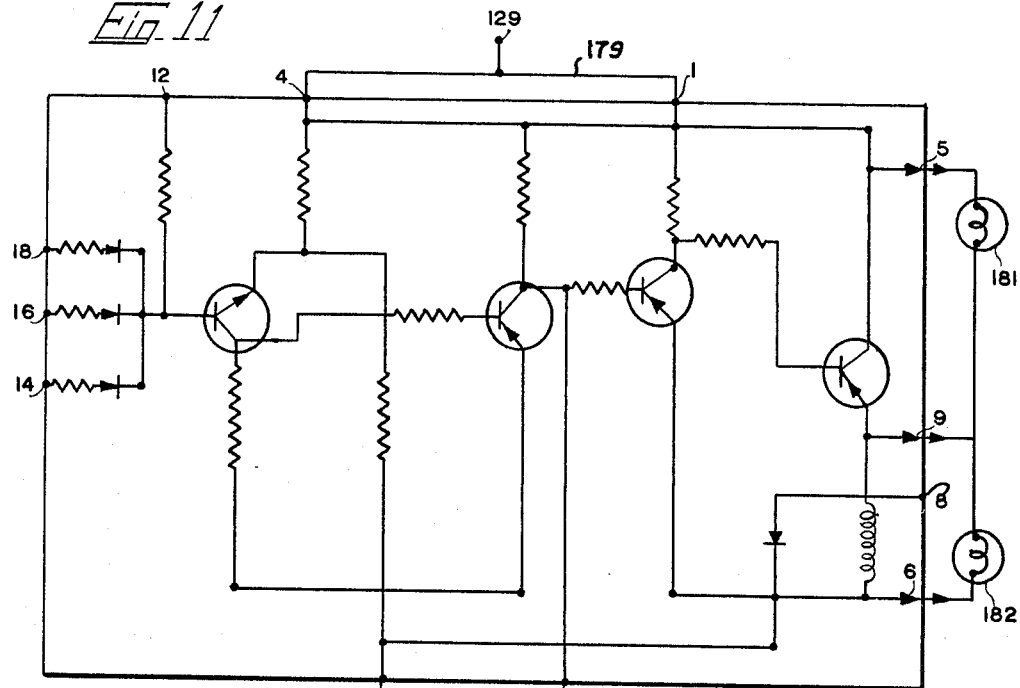

FIGURE 2 is a circuit diagram of board 1;
FIGURE 3 is a circuit diagram of board 2;
FIGURE 4 is a circuit diagram of boards 3, 7, 8, 9, 14, 16, 18, 20, 25, 26, 27, 29, 31 and 33;
FIGURE 5 is a circuit diagram of boards 4, 6 and 13;
FIGURE 6 is a circuit diagram of a modification of boards 4 and 6 shown in FIGURE 5, the showing being of a portion of the circuitry utilized on board 13 only;
FIGURE 7 is a circuit diagram of board 5;
FIGURE 8 is a circuit diagram of board 10;
FIGURE 9 is a circuit diagram of boards 11, 22, 23 and 24;
FIGURE 10 is a circuit diagram of board 12;
FIGURE 11 is a circuit diagram of matrix boards 15, 17, 19, 21, 28, 30, 32 and 34;
FIGURE 12 is a diagram of board 35;
FIGURE 13 is a circuit diagram of board 36; and
FIGURE 14 is a schematic layout of the lamp driver boards, one of the blocks representing a lamp driver board being enlarged to show the typical circuitry thereof.

While a liquid dispensing mechanism pursuant to the invention can be embodied in a number of different ways, it has successfulwly been embodied as a gasoline dispenser as disclosed herein with the design arranged to use a number of parts which are presently commerically available. In this arrangement, the environment includes the customary kind of liquid storage tank 6 for gasoline or the like from which a connection 7 leads to a pump 8. This pump not only includes a liquid displacement unit, but likewise includes an electrically actuated driving motor 9, the entire assembly being referred to generally as an electric pump. It is effective to discharge liquid from the conduit 7 into a conduit 10 leading to a meter 11. This meter is effective to measure the volume of liquid passing through it and is further effective to generate for transmission an electrical impulse for each given quantity of liquid flowing therethrough.

In the present instance, there is utilized as the meter 11 a commercially available structure effective to provide two thousand electrical pulses per gallon of liquid measured. From the meter 11 a pipe 12 leads to a hose 13 on the end of which is situated a nozzle 14 and the customary valve mechanism. Thus, when the pump 8 is electrically energized, fluid is transferred from the tank 6 through the meter and through the connecting pipes for outflow from the nozzle 14. Flow through the nozzle can be controlled in the regular way by a handle 16 operating an appropriate shut-off valve. In addition, the shut-off valve can also be actuated by an electrical solenoid 17, the arrangement being such that the valve is normally closed but is held open by the solenoid 17 when the solenoid is energized. When the solenoid is de-energized, the valve is abruptly closed.

To trace the operation of the liquid dispensing mechanism, it is first considered that the mechanism is in appropriate condition for operation; that is, that all registers, indicators and other items which may be varied during operation are or have been reset to starting or zero condition and that the electrically driven pump 8 is properly energized from an electric circuit including conductors 18 and 19 extending to a suitable source of appropriate electromotive force such as a 115 volt supply. In the circuit including the conductors 18 and 19 is a normally open switch 21. When closed, this energizes the pump 8 so that when the nozzle valve is open, gasoline is withdrawn from the tank 6 and flows through the meter 11 and is discharged from the nozzle 14.

As each gallon of liquid passes through the meter 11, the meter dispatches two thousand pulses through an appropiate channel represented by the conductor 23 in FIGURE 1A. The return circuitry is represented as by ground or is standard and is not illustrated for simplicity. While two thousand pulses per gallon or one pulse for each one/two-thousandth of a gallon can be directly utilized, it is preferred for gasoline dispensing to reduce the pulse number per gallon. For that reason, the channel 23 leads to a board No. 1. In this description, references are made to various boards and pins and the reference numbers or letters and designations are peculiar to each. This is for the purpose of relating to circuit boards which are normally commercially available or can readily be modified from commercially available boards, and the board and pin designations are those which have actually been utilized in practice. The term "board" refers generally to a nonconductor or base on which the metallic circuitry and components are mounted. The term "pin" refers to a connecting point on the particular board.

Channel 23 carries two thousand pulses per gallon at an amplitude of about 10 millivolts to a pin B on a board No. 1. The function of the board No. 1 is to amplify the relatively weak pulses received directly from the meter 11. Its detailed circuitry is described hereinafter. The board No. 1 dispatches through a channel 26 two thousand pulses per gallon at an amplitude of 10 volts. The strengthened pulses in the channel 26 are then available at a pin 12 on a board No. 2, which is a divider. Also, the board No. 2 is an amplifier. For each two thousand pulses at 10 volts coming in through channel 26 on a pin 12 to the board No. 2 there are dispatched from a pin 1 of the board No. 2 one thousand pulses with an amplitude of 30 volts. Thus, the board No. 2 divides the number of pulses in half and increases the pulse voltage three times.

From the pin 1 of the board No. 2 a channel 27 leads to a pin 7 of a board No. 3. This is a simple divider and is effective to make available on a pin 4 of the board No. 3 an output of one pulse at 30 volts for each ten pulses put in. Thus, for the thousand pulses per gallon received by the board No. 3, but one hundred pulses per gallon are dispatched therefrom. A channel 28 connects a pin 4 of the board No. 3 to a pin 3 of a board No. 4. The board No. 4 is a buffer and also is an "and" gate. The input to the board No. 4 at the pin 3 is a square wave function and in passing through the board No. 4 is converted to a spike output on a pin 8, the number of pulses being the same. The input of one hundred square wave pulses per gallon on the pin 3 of the board No. 4 is represented by a spike output at a pin 8 of the board No. 4 of one hundred pulses per gallon.

A channel 29 (FIGURES 1A and 1B) carries one hundred spike pulses per gallon to an input pin 12 of a board No. 5 described in detail later. It is a flip-flop effective to be actuated "on" and to stay on until actuated "off." Upon the appearance of a pulse at the pin 12 of the board No. 5, the board is turned "on" and provides a pulse at an output pin 1 of the board No. 5 for a channel 31. This terminates at a pin 16 of a board No. 6, which is a buffer and an "and" gate.

Operating in conjunction with the board No. 6 is a standard oscillator included in a board No. 11. This oscillator functions at a fixed frequency of one hundred kilocycles/sec. When an individual pulse is received at the board No. 6, pin 16, the board No. 6 is gated "on" to the output of the oscillator board No. 11. The output at the indicated frequency, available at a pin 14 of the board No. 11, follows a channel 32 to a pin 3 of the board No. 6 and through the board No. 6 to an output pin 8 thereof. From the output pin 8, a pulse of the indicated frequency, one hundred kilocycles/sec., travels through a channel 33 to a pin 7 of a board No. 7. The function of the board No. 7 is to act as a frequency divider by a factor of ten. For each pulse received on a pin 7, this effect causes the dispatch from a pin 8 of the board No. 7 of a pulse at a frequency one-tenth of one hundred kilocycles/sec. or ten kilocycles/sec. A channel 34 connects between the pin 8 of the board No. 7 and a pin 7 of a board No. 8 and provides the board No. 8 with a pulse having a frequency of ten kilocycles/sec. again divided by a factor of ten. Thus, the output of a pin 4 of the board No. 8 is one kilocycle/sec. or one thousand cycles per second, travelling in a channel 36 to a pin 7 of a board No. 9. Again, the board No. 9 is a divider by a factor of ten, so that at an output pin 4 of the board No. 9 there appears a pulse having a frequency of one-tenth of one thousand cycles/sec. or one hundred cycles per second.

A channel 37 carries the pulse having a frequency of one hundred cycles per second to a pin 12 of a board No. 10 which is a one-shot multivibrator. When one cycle of the incoming pulse has activated the multivibrator, from a pin 1 thereof a pulse is dispatched through a channel 38. Channel 38 extends from the board No. 10, pin 1, to a pin 4 on the board No. 5. Since the incoming frequency to the board No. 10 at the pin 12 is one hundred cycles per second, and since but one cycle of the incoming pulse is effective to actuate the multivibrator board No 10, the output from the board No. 10 on the pin 1 thereof occurs one/one-hundredth of a second after the input thereto, which is substantially simultaneous with the appearance of a pulse at the pin 1 of the board No. 5. Thus, one/one-hundredth of a second, exactly, after the dispatch of a pulse from the pin 1, board No. 5, a pulse is received at the pin 4, board No. 5.

These particularly timed pulses are utilized to control a flip-flop gating mechanism included in a board No. 12. When there is an output at the pin 1 of the board No. 5, there is also a comparable output at a pin 2 of the board No. 5 carried through a channel 41 to a pin 14 of the board No. 12, which is a flip-flop effective to hold a circuit "off." When there is a pulse at a pin 4 of the board No. 5, one/one-hundredth of a second later than the pulse at the pins 1 and 2 of the board No. 5, then in effect the connection is transferred from the pin 2 of the board No. 5 to the pin 16 of the board No. 5 and through a parallel channel 42 provides a pulse at a pin 4 of a board No. 12. In this fashion, the board No. 12 is effective to provide at its outlet pin 1 a number of pulses at the rate of one hundred pulses per gallon passing through the meter 11 with each of those pulses at the pin 1 of the board No. 12 having a duration of exactly one/one-hundredth of a second.

The pulses from the board No. 12, pin 1, are utilized to actuate an accumulating and indicating mechanism. Preferably they are used also for automatic control of the pumping function. In some instances counting is taken care of simply in terms of cash such as dollars, dimes and cents. In other instances counting is taken care of in terms of volume such as gallons and tenths. In most instances it is preferred to have available both types of counting and control; that is, counting and control by means of cash quantity and counting and control by means of gallon quantity. In the case simply of a gallons' counter and indicator it is not critical that each pulse be precisely one/one-hundredth of a second in duration. But this factor is of consequence in connection with counting in terms of dollars and fractions thereof.

Considering first that pulses available at the pin 1 of the board No. 12 are utilized in connection with a gallons' counter, they are traced through a channel 45 to a pin 7 on a Board No. 14, which is a counter and divider. Commercially available units such as the board No. 14 are effective to take the pulses incoming on the pin 7 and to distribute them in sequence to output pins. The commercially available boards No. 14 are provided with only eight output pins numbered in sequence 1, 2, 3, 6, 9, 10, 12 and 13. In order that this particular pin arrangement can be utilized in connection with a decimal counting system, each of the pins numbered 1, 2, 3, 6, 9, 10, 12 and 13 of the board No. 14 is connected by its individual channel, such as 44, to corresponding pins numbered 2, 4, 15, 17, 8, 6, 13 and 11 on a matrix board No. 15. A matrix board is illustrated in detail in FIGURE 11 and has as its function the conversion of pulses incoming on its eight input pins singly or in combination into appropriate pulses on its ten output pins respectively numbered 1, 3, 5, 7, 9, 10, 12, 14, 16 and 18. Thus, for each ten successive pulses arriving at board No. 14 on the pin 7, there are available on the outlet pins of the matrix board No. 15 ten pulses arranged in sequential order.

Because the outlet pulses from the matrix board are relatively weak, each one of them in its respective channel, such as 46, passes through one of a number of lamp drivers 47, each indicated by a black square in FIGURE 1B and in FIGURE 1C. The lamp drivers are effective to increase the signal strength and to impress the signals from the outlet pins of the matrix No. 15 respectviely on the input pins numbered consecutively 0, 1, 2, 3, 4, 5, 6, 7, 8 and 9 of a read-out No. 8. The read-out is standard component for display of numbers by light pattern. The read-out No. 8 gives an indication of each one-hundredth gallon which has been dispensed and accumulates and displays by electric illumination the number of one-hundredth gallons represented by the number of pulses it has received from the board No. 12. It is not customary that the read-out No. 8 be observed during dispensing, but it is for the purpose of getting an accurate reading when liquid dispensation stops.

The board No. 14 not only is effective to send signals to the matrix board No. 15 for the read-out No. 8, but also functions as a divider by a factor of ten. Thus, for each ten pulses of one/one-hundredth second duration each available on the pin 7 of the board No. 14, a single pulse is available on a pin 4 of the board No. 14 and travels through a channel 48 to a pin 7 on a board No. 16. Thus while the board No. 14 represents one/one-hundredth of a gallon for each pulse, the board No. 16 represents one-tenth of a gallon for each pulse. The same structure is utilized in connection with the board No. 16 as is utilized in connection with the board No. 14 and functions to supply eight outputs to a matrix board No. 17 acting through lamp drivers 51, like the lamp drivers 47, to supply a read-out No. 7 having input pins from 0 to 9 in sequence. The read-out No. 7 therefore indicates the number of tenths of a gallon which have passed through the pulsing meter.

The board No. 16 likewise acts as a divider by ten so that for each ten pulses, each of one/one-hundredth of a second duration, arriving at the pin 7, one pulse is available at a pin 4 of the board No. 16 and is carried by a channel 52 to a pin 7 of a board No. 18. Thus the board No. 18 becomes a gallon board. It is arranged, as previously described, to supply impulses through a matrix board No. 19 and through individual lamp drivers 53 to a read-out No. 6. The read-out No. 6 accumulates and indicates the number of whole gallons dispensed from zero to nine.

The board No. 18 is also a divider and for each ten pulses received on the pin 7 thereof, each having a duration of one/one-hundredth of a second, the board No. 18 makes available at a pin 4 a single pulse which travels through a channel 54 to a pin 7 on a board No. 20. Thus the board No. 20 is a tens gallons' board. Comparable, the board No. 20 is connected through a matrix board No. 21 to ten channels each having its individual lamp driver 56 making effective displays in a read-out No. 5. Tens gallons quantities from zero to nine are counted, accumulated and displayed by the read-out No. 5.

As this portion of the device works, the continued operation of the pump 8 and the meter 11 causes the quantity dispensed to be indicated by the read-outs Nos. 5, 6, 7 and 8. The usual order of display is from left to right, the reverse of the order shown in FIGURE 1B. Thus, the read-out No. 5 represents the number of tens gallons, the read-out No. 6 represents the number of whole gallons, the read-out No. 7 represents the number of tenths gallons, whereas the read-out No. 8 represents the number of one-hundredths gallons.

In many places by regulation of the authorities the consumer must be given an accurate indication of the quantity pumped, the accuracy being to the nearest tenth gallon. The read-outs used herein are not continuously moving devices, but jump from one digit to the next. To be accurate to the nearest tenth gallon in the tenths gallon read out No. 7, it is necessary to have the read-out No. 8 indicating the hundredths gallons. Thus, if the read-out No. 7 shows seven-tenths of a gallon, it may be almost ready to change to eight-tenths of a gallon. This can be determined by reading the adjacent one-hundredths gallon read-out No. 8. If the read-out No. 8 shows less than five one-hundredths of a gallon, then the read-out No. 7 is considered correct as it displays. If the read-out No. 8 shows more than five one-hundredths of a gallon, then the read-out No. 7 is read as indicating the next higher tenths of a gallon.

In instances wherein a cash or dollar indication is desired, the pin 1 of the board No. 12 is provided with branching channels. That is, in addition to the channel 45 leading the board No. 14, there is also provided a channel 61 (FIGURES 1B, 1C and 1D) terminating at a pin 16 of a board No. 13. This board is partly a buffer and also acts as an "and" gate, being gated "on" by a signal received at the pin 16. The board No. 13 is effective to control the operation of a price computing mechanism. Arranged adjacent the board No. 13 are boards Nos. 22, 23 and 24. These are substantially identical. Each of them is a rate gate oscillator, being controlled as to frequency by an accurate crystal control. The frequency of each of the boards Nos. 22, 23 and 24 is directly proportional to one of several going prices of gasoline expressed in cents per gallon. For example, if the price of gasoline is 32.9¢ per gallon, then the board No. 22 is provided with an oscillator having a fixed frequency of thirty-two thousand, nine hundred cycles per second. Comparably, if gasoline is also priced at 33.9¢ per gallon, then the board No. 23 is provided with an oscillator having a frequency of thirty-three thousand, nine hundred cycles per second. Similarly, if the price of gasoline is also 34.9¢ per gallon, then the board No. 24 has a crystal control providing a frequency of thirty-four thousand, nine hundred cycles per second.

While three separate and individual boards are provided herein to afford immediate access to any one of three different prices, it is equally feasible to utilize more boards or to utilize but a single board having replaceable crystals or to afford an arrangement in which the frequency standard is readily varied, even by remote control, to correspond to or to be proportional to the stated price in cents per gallon or comparable figures. To make the various prices available by choice, a pin 14 of the board No. 22 is joined by a channel 66 to a switch point 67 while a pin 14 of the board No. 23 is joined to a switch point 68 through a channel 69 and a pin 14 of the board No. 24 is joined through a channel 71 with a switch point 72. A manually movable switch contact 73 can be positioned to connect any one of the channels 66, 69 and 71 to a channel 74 extending to a pin 3 of the board No. 13.

When the board No. 12 (FIGURE 1B) is gated "on" at the beginning of a pulse, the signal at the pin 1 is transmitted through the channel 61 to the pin 16 of the board No. 13 and gates the board No. 13 "on." The price signal available at the selected frequency; for example, thirty-three thousand, nine hundred cycles per second, available at the pin 3 of the boad No. 13, is also made available at a pin 8 of the board No. 13. Since the board No. 12 is gated "off" exactly one/one-hundredth of a second after it is gated "on," the duration of the pulse at the pin 16 of the board No. 13 is likewise only one/one-hundredth of a second. The incoming frequency on the pin 3 is, for example, thirty-three thousand, nine hundred cycles per second, so that in one/one-hundredth of a second, the time that the board No. 13 is "on," there are passed to and made available at the pin 8 exactly three hundred and thirty-nine cycles. These are transmitted through a channel 76 into a divider board No. 25, being available at a pin 7 thereof.

The board No. 25 is effective to divide the incoming signal by a factor of ten and to make available on a pin 4 thereof one output pulse for each ten incoming pulses. A channel 77 (FIGURES 1D and 1C) joins the pin 4 of the board No. 25 to a pin 7 of a board No. 26 (FIGURE 1C). The board No. 26 also is a divider and acts to reduce the pulses in number by a factor of ten so that there are available on an output pin 4 of a board No. 26 one-tenth the number of incoming pulses. Similarly, a channel 78 makes these pulses available on an incoming pin 7 of a board No. 27. The board No. 27 is directly comparable to the board No. 14, for example, (FIGURE 1B) and is effective to provide a sequential output of the incoming pulses on pins numbered 1, 2, 3, 6, 9, 10, 12 and 13. Since it is desired to have a decimal system rather than simply the commercially available eight outputs, the various numbered pins in the board No. 27 are connected through appropriate channels 79 to a matrix board No. 28 just like the matrix board No. 15. This is effective through ten outlet pins numbered 1, 3, 5, 7, 9, 11, 12, 14, 16 and 18 to supply individual channels 81 leading to a read-out No. 4 through intervening lamp drivers 82 individual to each channel. The read-out No. 4 is effective to read decimally in mills.

The board No. 27 in addition to being a sequential mechanism is also a divider and makes available on a pin 4 one pulse for each ten incoming pulses on the pin 7 thereof. The pulses are passed from the pin 4, board No. 27, through a channel 83 to a board No. 29 and are received thereon on a pin 7. This is a duplicate of the preceding mechanism and is effective through a matrix board No. 30 and lamp drivers 86 to energize a read-out No. 3 effective to read in cents.

The board No. 29 is also a divider and transmits from a pin 4 through a channel 88 to a pin 7 of a board No. 31. The pulses arriving at the pin 7, board No. 31, are distributed as previously described through a matrix No. 32 and various channels 89, each having its own lamp driver 91, to a read-out No. 2 adapted to display a quantity expressed as dimes.

From the pin 4 of the board No. 31 a channel 92 carries a single pulse for each ten pulses received by the divider No. 31 to a pin 7 of the board No. 33. This is comparable to the preceding boards and is effective through a matrix No. 34 and channels 96 and lamp drivers 97 to actuate a read-out No. 1 calibrated to read in dollars.

With this arrangement, therefore, the read-outs Nos. 1, 2, 3 and 4 display the quantity of liquid dispensed in terms of the total price of the liquid computed on the unit price per gallon. Thus, the read-out No. 1 reads in dollars, the read-out No. 2 reads in dimes, the read-out No. 3 reads in cents, whereas the read-out No. 4 is read as tenths of cents or mills. The actual order of arrangement of the read-outs is the reverse of that shown in FIGURE 1C. Since the read-out No. 3, being intermittent, does not indicate the difference between one cent and two cents to the nearest half cent, as many regulations provide, the adjacent mills read-out No. 4 is used to indicate the number of mills or tenths of one cent. If the indicated mills fraction is below one-half cent, then the read-out No. 3 is considered accurate, whereas if the number of mills indicated by the read-out No. 4 is greater than one-half cent, then the read-out No. 3 is accordingly read to the next higher cent.

With all of this mechanism operating, there is supplied simultaneously a digital read-out of the quantity dispensed, indicated and accumulated both as number of gallons accurately readable to the nearest one-tenth gallon and also the number of dollars worth accurately readable to the nearest cent.

When any pumped amount of gasoline has been visually displayed and observed, the dispensing operation can be terminated by the operator manually releasing the handle 16. The valve in the nozzle 14 promptly closes, flow stops and the meter 11 no longer operates. There are no further pulses from the meter to energize the system. The operator can then restore the nozzle mechanism 14 to a cradle (not shown) in which the weight of the nozzle is effective to open a normally closed switch 7B (FIGURE 1A) and simultaneously to close a normally open switch 7A (FIGURE 1D). Opening of the switch 7B is effective to de-energize the motor 9 of the pump 8 and the closure of the switch 7B makes potentially effective a series switch 6A (FIGURE 1D).

When the switch 6A is subsequently manually closed, a reset pulse goes through a circuit indicated by an arrowhead and the legend "Reset" in FIGURE 1D to each of the other circuit portions indicated by arrowheads in the remaining figures of the drawings. All of the registers and indicators upon closure of the switch 6A are thus restored to their starting or zero condition, available for subsequent operation of the machine. Since the switches 6A and 7A are in series, it is not possible for the operator by inadvertent closure of the switch 6A during dispensing of gasoline to reset the mechanism to zero. Rather, the nozzle has to be in its cradle holding the switch 7A closed before the operator can provide a reset pulse by closing the switch 6A.

Means are provided for automatically interrupting the flow of liquid when a predetermined, preset amount measured by volume or measured by cash has been dispensed. It is possible to make this arrangement so that both a dollar quantity and a gallon quantity, for example, can be preselected so that whichever is first arrived at will produce an automatic shut-off. It is preferred, however, to make an arrangement in which the shut-off is accomplished in accordance with either one of these factors. For this reason, as indicated particularly in FIGURES 1B and 1C, the read-out No. 7 is continued and is connected to various switch points 101 arranged from 0 to 9 in numerical sequence corresponding to the sequence of the read-out and arranged as part of a switch Sw1 (FIGURE 1B) so connected with the tenths gallon indication.

The switch Sw1 preferably has a plurality of decks, the connection to the tenths gallon read-out being by means of a deck A. Comparably, the switch Sw1 also has a deck B (FIGURE 1C) having appropriate points 102 connected in appropriate sequence with the read-out No. 3 of the cash counting mechanism to afford individual positions corresponding to the cents indication. In the same fashion, the gallons read-out No. 6 is provided with a switch Sw2 having comparable points 103 arranged in a deck A and having comparable points 104 arranged in a deck B joined to the dimes cash readout No. 2.

In a similar fashion, there is provided a switch Sw3 including points 106 in a deck A arranged in sequence and connected to the read-out No. 5 associated with the tens of gallons register. The deck B of the switch Sw3 has points 107 in the deck B connected to the read-out No. 1, the dollar indicator.

In order that the deck A of the switches Sw1, Sw2, and Sw3 can be selected as an alternative to the deck B of those switches and in order that there be in addition a manual position in which the automatic stop switches are not involved, there is provided a gang switch Sw4 (FIGURE 1C) having four decks. The deck A includes points 111, 112 and 113, the deck B includes points 114, 116 and 117, the deck C includes points 118, 119 and 121, and the deck D has points 122, 123 and 124. All of the four decks A, B, C and D of the switch Sw4 are ganged together.

The user may initially make a selection by placing the switch Sw4 either in a central, manual position in which the points 123, 112, 116 and 119 are involved, or, if he desires to have cut-off based on the gallonage dispensed, he may place the decks of the switch Sw4 in a left-hand position so that the points 122, 111, 114 and 118 are involved. As a third choice, in the event cut-off is to be on the basis of cash indicated, then the switch Sw4 can be arranged in a right-hand position so that the points 124, 113, 117 and 121 are involved.

If the selector switch Sw4 is not in the manual position, the user may then set either the gallons cut-off or the cash cut-off, depending upon his previous selection, at the desired quantities. For that the user operates the deck A of the switches Sw1, Sw2 and Sw3 for the gallons cut-off. He places the various movable switch arms in connection with the particular points of the series 101, 103 or 106 equal to the number of gallons and tenths desired. For example, if the user wants 12.3 gallons, then the switch Sw3, deck A, is moved to the "one" position, the switch Sw2, deck A, is moved to the "two" position, and the switch Sw1, deck A, is moved to the "three" position.

Correspondingly, in the event that switch Sw4 has been set to indicate a cash automatic cut-off, then if the amount of gasoline desired is $4.56 worth at the prevailing rate, switch Sw3, deck B, is arranged so that the movable pointer is in connection with the point of the series 107 representing $4, the pointer of the switch Sw2, deck B, is set to the contact of the series 104 representing 50¢, whereas the pointer of the switch Sw1, deck B, is set to the contact of the series 102 that represents 6¢.

When the mechanism is put into operation under these circumstances, first considering that the switch Sw4 and the switches Sw1, Sw2 and Sw3, deck A, have been set up for the desired gallonage, then when an impulse comes to the read-out No. 7, it is transferred to the point series 101. Upon finding a connection at one of the points, the impulse travels through a channel 131 to the point 111 (FIGURE 1C) of the switch Sw4 and then continues on a conductor 132 (FIGURES 1B and 1A) to a pin 18 on a board No. 35 where that pulse is effective in partially conditioning the board No. 35 to shut off operation. When a pulse from the read-out No. 6 travels through the set one of the point series 103, it leaves the appropriate point through a conductor 133 and travels through the point 114 of the switch Sw4 and through a conductor 134, also being effective partially to condition the board No. 35 to shut-off condition. Finally, when a pulse in the read-out No. 5 is effective on the appropriate one of the points in the series 106, it travels through a conductor 136 to the point 118 of the switch Sw4 and continues through a conductor 138 to the board No. 35. The board No. 35 is so constructed that upon receipt of the third pulse from the deck A of the switches Sw1, Sw2, Sw3, it is effective to de-energize the solenoid 17 and thus promptly to interrupt the liquid dispensing operation. Under these circumstances, the point 122 of the deck D of the switch Sw4 is inactive.

If the switch Sw4 has been set by the user to have cut-off on the cash indication, then when the read-out No. 3, for example, sends an impulse to the appropriate one of the points in the series 102, the impulse travels through a conductor 141 to the switch point 113 and from there travels on the conductor 132 as before. Similarly when the read-out No. 2 arrives at the indicated or set value, the related point of the series 104 is connected through the switch Sw2, deck B, and a conductor 142 to the point 117 from which the pulse travels through the conductor 134 as before. Finally, when a pulse from the dollar read-out No. 1 arrives at the preset point of the series 107, the pulse travels through a conductor 143 to the point 121 and thence through the conductor 138 to the board No. 35 so that upon receipt of the third pulse the board No. 35 shuts off the nozzle.

Since the operation time of the solenoid 17 and of the valve in the nozzle 14 in some commercial devices is relatively slow and might permit some extra flow of liquid and over-run of the indicators, it is preferred that there be a much quicker cut-off of the operation of the circuitry. Thus as soon as the third signal from the conductor 138 is received at a pin 14 at the board No. 35 and even though that signal is immediately transmitted to de-energize the solenoid 17 and close the valve, at the same instant the signal is likewise effective at a pin 2 of the board No. 35 to send a current on a conductor 146 and through a branch conductor 147 extending to a pin 16 of the board No. 4. This current at the board No. 4 immediately prevents further signal transmission by the board and no further "coasting" impulses can be transmitted to the remainder of the circuitry.

At the same time, the conductor 146 through a branch 148 (FIGURES 1A, 1D and 1C) is effective through the switch point 124 of deck D of the switch Sw4, when the movable switch part is in the cash position, to continue the current through a conductor 149 (FIGURES 1C and 1D) to a pin 14 of the board No. 13. This current immediately prevents further signal transmission by the board No. 13 and prevents the transmission of any further signals to the remainder of the circuitry. Instantly upon arrival of the cash indicator read-outs Nos. 1, 2 and 3 at the selected amount, the impulse and price computing electrical circuitry is blocked and the solenoid 17 shuts the valve in the nozzle 14 very promptly thereafter. If the response of the solenoid 17 and the valve in the nozzle 14 is in fact sufficiently rapid, then a circuit shut-off arrangement, depending upon a signal in the conductor 146, is no longer necessary.

If neither an automatic cash cut-off or an automatic gallon cut-off is desired, the switch Sw4, decks A, B, C and D, is put in the central, manual position with the movable switch members in connection with the points 123, 112, 116 and 119. The point 123 has no connection, but the points 112, 116 and 119 are all connected by a conductor 151 to ground so that cut-off can only occur by operation of the valve handle 16 in the nozzle 14. When the nozzle 14 is removed from its cradle, a switch 7B (FIGURE 1A), a self-closing switch held open by the weight of the cradled nozzle, is thereby permitted to close. The closure is effective through a pin 10 of a board No. 36 and through a pin 17 thereof to energize a relay coil 153 to close the switch 21, thus energizing the motor 9 of the pump 8. Correspondingly, when the nozzle is replaced in its cradle, the weight of the nozzle opens the switch 7B and the coil 153 is de-energized so that the relay switch 21 opens and the pump motor is stopped. In this fashion, the user simply by manipulating the lever 16 when the nozzle is uncradled can dispense any amount of gasoline that he chooses, and while there will be indications of both the gallons dispensed and the dollar value thereof, there will be no automatic cut-off by either of those factors.

The various different voltages required in the circuitry are obtained, as shown particularly in FIGURE 1D, from a standard power supply connected to the usual 115 volt alternating current source and having outputs as labelled in that figure. Some of the major conductors and return connections are not described in detail since they are readily apparently from the drawing figures. Also, the various boards which are referred to are described only briefly since their circuitry is generally apparent from the diagrams.

For example, by reference to FIGURE 2, the circuitry of the board No. 1 can be determined. The pulse input from the meter 11 occurs at the pin B and the ground connection is at the pin V. Since the board is a relatively standard item, for this installation a jumper 161 is connected across the pins E and F. From a pin A a connection is to the −15 volts power supply. The connection of a pin H is to +15 volts of the power supply. The pins A and M are joined as shown in FIGURE 1A by a voltage divider 162 to the center point of which the channel 26 is joined. The remaining circuitry on the board is represented by standard connections and symbols.

The board No. 2, shown in FIGURE 3 and effective to divide by two, has its input on the pin 12 and its output on the pin 1. A pin 14 is typical of many reset connections shown in FIGURES 1A, 1B, 1C and 1D and is represented in the drawings not by continuous lines but by an arrowhead terminal with the letter R. All of the reset terminals are joined together in parallel. The pins 7 and 9 are connected by a jumper 163 joined to ground, while a pin 18 is joined to a conductor network 164 traced to the —40 volt connection at the power supply as shown in FIGURE 1D.

The board No. 3, which is illustrated in FIGURE 4, is a divider by ten as well as an amplifier and is duplicated by many other boards herein. The input occurs on a pin 7, whereas a pin 11 is connected to ground. A pin 15 goes to the conductor network 164 and a pin 14 is the reset connection. The output is from a pin 4. Other pins available on the standard board are not utilized in the board No. 3 position, but the pins 1, 2, 10, 9, 13, 12, 3 and 6 are utilized as the logic output on the boards Nos. 14, 16, 18, 20, 27, 29, 31 and 33. The divider circuitry, like that of the board No. 3, is utilized on the boards Nos. 7, 8 and 9 and on the boards Nos. 25 and 26.

The board No. 4, which is a buffer and an "and" gate, is set up as shown in FIGURE 5. The input to the board No. 4 is on a pin 3 and the output is on a pin 8. A pin 18 is connected to ground, a pin 1 is joined to the conductor network 164, while a pin 16 is joined to the conductor 147. The same circuit as shown in FIGURE 5 is utilized for the board No. 6 and is utilized also for the board No. 13 except that there is provided on the board No. 13, as shown in FIGURE 6, a particular junction 166 joined through a resistor 167 and a diode 168 to a pin 14, itself joined to the conductor 149.

As shown in FIGURE 7, the board No. 5 receives its input on a pin 12 and affords on output on a pin 1. A pin 3 is connected to reset. The conductor 38 brings the one hundred cycle per second signal in on a pin 4. Pins 7 and 9 are connected by a jumper 171 and to ground and a pin 18 is joined to the conductor network 164. Pins 2 and 16 are utilized through conductors 41 and 42 to control the board No. 12.

The board No. 10, the one-shot multivibrator, is illustrated in FIGURE 8. The input thereto is received on a pin 12, whereas the output is taken from a pin 1. A pin 18 is joined to the conductor network 164 and pins 7 and 9 are connected by a jumper 172 to ground.

The boards Nos. 11, 22, 23 and 24 which are oscillators at predetermined or set frequencies are illustrated in FIGURE 9. In these boards a pin 18 is connected to the conductor network 164 and the output is at a pin 14. Pins 15 and 16 are connected by a jumper 173 to ground.

FIGURE 10 shows the board No. 12, which is flip-flop circuitry. In this arrangement, a pin 18 goes to the conductor network 164, while the output is on a pin 1. A pin 3 goes to the reset connection, pins 7 and 9 are connected by a jumper 174 to ground, a pin 14 is joined to the conductor 41 extending to the pin 2 of the board No. 5, while a pin 4 is joined by the conductor 42 to the pin 16 of the board No. 5.

As shown in FIGURE 11, the various matrix boards Nos. 15, 17, 19, 21, 28, 30, 32 and 34 are all connected as illustrated. The eight inputs from their associated divider boards are received on the pins 2, 4, 6, 8, 11, 13, 15 and 17, whereas the ten outputs are furnished on the pins 1, 3, 5, 7, 9, 10, 12, 14, 16 and 18. The various series of crossed conductors, such as 176 and 177, of the matrix are at appropriate locations interconnected by diodes, such as 178, so that input impulses singly or in combination are appropriately distributed to afford a correct decimal output. In an instance in which appropriate divider circuits are available with ten outputs, the matrix boards are dispensed with and each divider board, such as the board No. 14, is connected directly to its individual read-out, such as the read-out No. 8.

FIGURE 12 illustrates the board No. 35, the automatic shut-off and gating board which also furnishes certain operation indications. In the board No. 35 a pin 12 is connected to the conductor network 164 affording —40 volts, while pins 1 and 4 are jumpered to a conductor 179 supplying —14 volts. A pin 14 is joined to the conductor 138 of deck C of the switch Sw4. A pin 16 is joined to the conductor 134 of deck B of the switch Sw4, while a pin 18 is joined to the conductor 132 of deck A of the switch Sw4. A pin 7 is connected to ground and to one side of the solenoid 17, whereas a pin 8 is connected to the other side of the solenoid 17. A pin 2 is joined by the conductor 146 and the branches 147 and 148 to the output controls in boards Nos. 4 and 13. Pins 5, 9 and 6 are utilized respectively for the illumination of a display light 181 in red indicating that the circuitry is not ready for further operation and a display light 182 is green indicating that the system is ready for use.

For controlling the motor 9, the board No. 36 is set up as shown in FIGURE 13. Pins 1, 2, 3 and 4 are joined by conductors 191, 192, 193 and 194, respectively, to the volume read-outs so that the motor control cannot be initially energized unless all of the quantity indicators are in zero position for starting the cycle. Similarly, pins 5, 6, 7 and 8 through conductors 196, 197, 198 and 199 extend to the corresponding zero indicators of the cash read-outs Nos. 4, 3, 2 and 1 so that the motor cannot be initially energized in the event the cash read-outs have not been reset or cleared. A pin 18 is joined to the conductor 179 and the source of —14 volts, while a pin 10 is joined to the conductor network 164 through the switch 7B to the source of —40 volts. A pin 17 affords the output to govern the operation of the solenoid coil 153 for the switch 21.

The diagram in FIGURE 14 shows the construction and layout of the lamp drivers. In the upper left-hand portion of FIGURE 14 there is an enlargement showing the circuitry of all of the lamp drivers. Therein, a pin A is connected to the output pin 1 of the associated matrix. A pin X is joined to a conductor 200 (FIGURES 1B, 1A and 1D) leading to the supply of —20 volts. The pin Y is connected by a common conductor 201 to ground. In each of the other lamp drivers shown in FIGURE 14, the X pin is connected through the conductor 200 to —20 volts, the Y pin is connected to ground, and the input pins A are connected to the matrix numbers as indicated, such as 3, 5, 7, 9, 10, 12, 14, 16 and 18. The output pin B of each driver is connected to the corresponding read-out pin in sequence from 0 to 9, inclusive.

There has consequently been provided in accordance with our invention a liquid dispensing mechanism virtually devoid of moving parts and effective largely by electronic means not only to permit the customary manual dispensing of liquid with or without a corresponding indication of the quantity of the liquid in gallons or in dollars worth, but also to permit an automatic shut-off dependent upon either the dollars worth or the gallons measure of the liquid being dispensed. Also provided is an interlocking mechanism so that dispensing cannot occur unless the read-outs or registers have all been previously cleared and so that clearing cannot take place during a dispensing operation. There is also provided means for employing the prevailing price of the fluid being dispensed in unit amounts, which gives a selection of various prices and which can easily be altered when necessary. The accuracy of the structure is considerably greater than that presently available since the oscillators can be held to an accuracy of .005 whereas the time period is accurate to about the same figure. There is thus provided a greatly improved device.

What is claimed is:
1. A liquid dispensing mechanism comprising a liquid meter effective to furnish a number of electrical pulses for each unit quantity of liquid passing therethrough, means forming an "and" gate, means for supplying said pulses thereto to turn said "and" gate on, a first fixed frequency oscillator providing a first output at a first predetermined frequency, means for dividing said first output frequency to provide a second output at a second prede- termined frequency, means responsive to said second output to turn said "and" gate off, a second fixed frequency oscillator providing a third output at a third frequency, means controlled by said "and" gate for sampling said third output only between the time said "and" gate is turned on and is turned off to provide a sample, a digital visual indicator, and means responsive to said sample for actuating said indicator to display said sample thereon.

2. A liquid dispensing mechanism comprising a liquid meter effective to furnish a number of electrical pulses for each unit quantity of liquid passing therethrough, means forming an "and" gate, means for supplying said pulses thereto to turn said "and" gate on, a first fixed frequency oscillator providing a first output at a first predetermined frequency, means responsive to said first output to turn said "and" gate off, a second fixed frequency oscillator providing a second output at a second predetermined frequency, means controlled by said "and" gate for sampling said second output only between the time said "and" gate is turned on and is turned off to provide a sample, and means responsive to said sample for visibly displaying a corresponding numerical value.

3. A liquid dispensing mechanism comprising a liquid meter effective to furnish a number of electrical pulses for each unit quantity of liquid passing therethrough, means forming an "and" gate, means for supplying said pulses to said "and" gate to turn said "and" gate on, a first fixed frequency oscillator providing a first output at a first predetermined frequency, a multivibrator, means effective when said "and" gate is turned on to impress said first output on said multivibrator, means controlled by the response of said multivibrator to the impression of said first output thereon to turn said "and" gate off, a second fixed frequency oscillator providing a second output at a second predetermined frequency, means effective between the time said "and" gate is turned on and the time said "and" gate is turned off for sampling said second output, and means responsive to said sample for displaying a corresponding numerical value.

4. A liquid dispensing mechanism as in claim 1 in which said second fixed frequency oscillator includes several frequency sources each of a different value and in which means are provided for selecting any one of said sources to provide said second output.

5. A liquid dispensing mechanism comprising a liquid meter effective to furnish a predetermined number of electrical pulses for each unit quantity of liquid passing therethrough, means responsive to said predetermined number of electrical pulses for supplying a smaller predetermined number of electrical actuating pulses, an "and" gate, a first oscillator furnishing a first output at a predetermined frequency, means responsive to said first output for supplying a second output at a lower predetermined frequency, a multivibrator responsive to said second output and operated in time therewith, means responsive to one of said actuating pulses for turning said "and" gate on and for subjecting said multivibrator to said second output, means responsive to said multivibrator for turning said "and" gate off a predetermined time after said "and" gate has been turned on, a second oscillator furnishing an output having a frequency bearing a predetermined relation to the price of said unit quantity of liquid, a price accumulator, and means for subjecting said price accumulator to said output of said second oscillator for said predetermined time.

6. A liquid dispensing mechanism as in claim 5 in which means are provided responsive to said price accumulator for interrupting the operation of said liquid meter.

References Cited by the Examiner
UNITED STATES PATENTS

| 3,039,685 | 6/1962 | Bagley et al. | 235—132 |
| 3,043,508 | 7/1962 | Wright | 235—132 X |
| 3,081,031 | 3/1963 | Livesay | 235—132 X |
| 3,199,727 | 8/1965 | Romanowski | 222—76 X |

M. HENSON WOOD, JR., *Primary Examiner.*

STANLEY H. TOLLBERG, *Examiner.*